W. L. MORRIS.
FILTER.
APPLICATION FILED APR. 25, 1910.
1,137,075.
Patented Apr. 27, 1915.
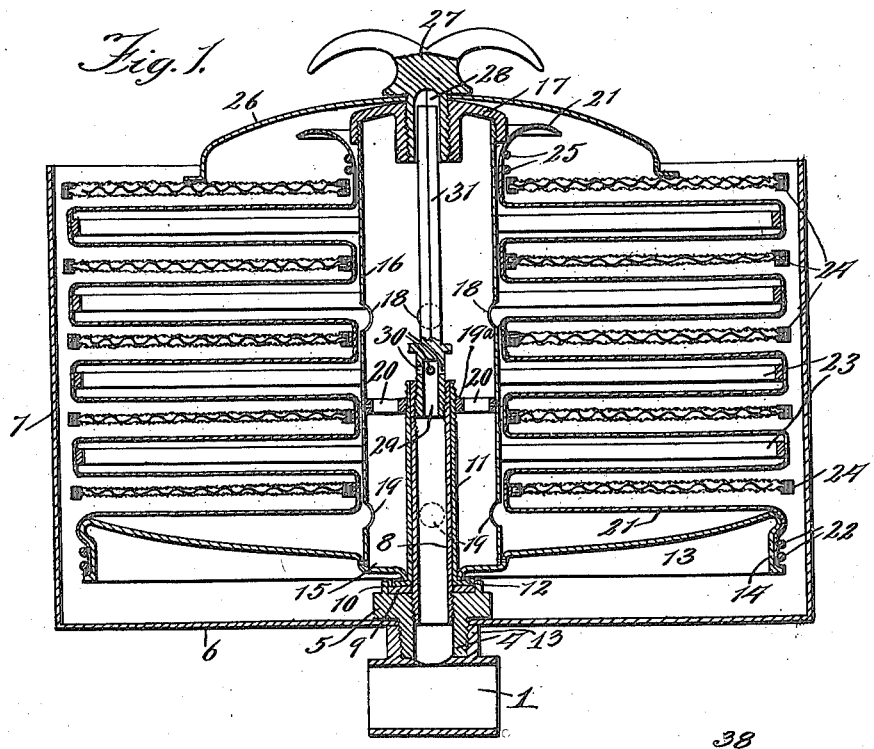
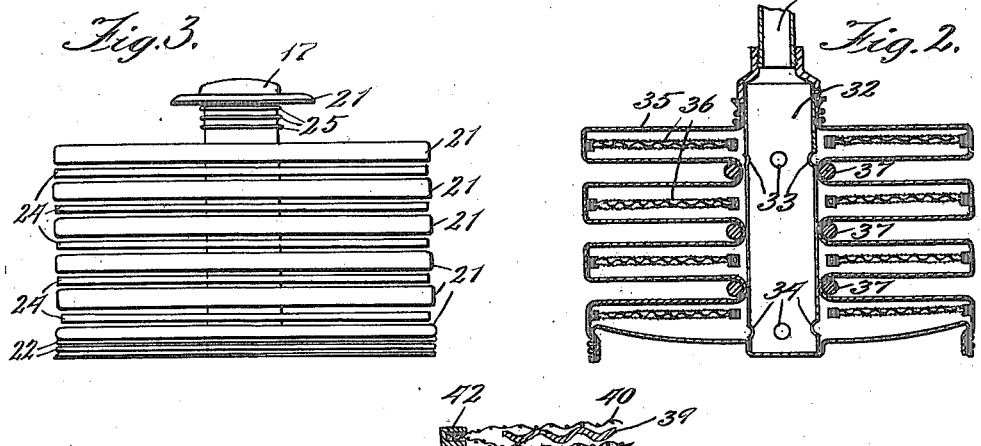
Witnesses:
Inventor:
William L. Morris

UNITED STATES PATENT OFFICE.

WILLIAM L. MORRIS, OF CHICAGO, ILLINOIS, ASSIGNOR TO S. F. BOWSER & CO., INC., OF FORT WAYNE, INDIANA, A CORPORATION OF INDIANA.

FILTER.

1,137,075.

Specification of Letters Patent.

Patented Apr. 27, 1915.

Application filed April 25, 1910. Serial No. 557,318.

*To all whom it may concern:*

Be it known that I, WILLIAM L. MORRIS, a citizen of the United States, residing at Chicago, in the county of Cook and State of Illinois, have invented certain new and useful Improvements in Filters, of which the following is a specification.

This invention relates to filters, and has for its primary object to provide an improved construction, combination and arrangement of parts in oil filters.

One of the objects of the present invention is to provide an improved filter in which a filter bag or sleeve of well known form may be set up in a restricted space without interfering with the filtering action through any portion of said bag or sleeve.

More specifically, one of the objects is to provide improved means for mounting the sleeve or bag whereby the material of which the bag or sleeve is composed may be disposed in collapsed formation, while the adjacent folds of the material are held out of contact with each other.

Another object is to provide an improved construction, combination and arrangement of parts in a device of this nature, enabling the filter to be simply and economically constructed, and for providing a filter which can be readily dismantled and cleaned.

Another object is to provide improved means for maintaining a pressure head upon one or more filters.

Another object is to provide improved means for removing water and other relatively heavy portions of the fluid before its passage through the filter.

Other and further objects will appear in the specification and be more specifically pointed out in the claims, reference being had to the accompanying drawings exemplifying the invention and in which—

Figure 1 is a section of one form of filter constructed in accordance with the principles of this invention, the several parts being separated one from another along the axis of the filter for the sake of clearness; Fig. 2 is a section of another embodiment; Fig. 3 is an elevation of a portion of the filter shown in Fig. 1, the filter housing having been removed; and Fig. 4 is an enlarged detail section of the peripheral edge of one of the reticulated screens for separating adjacent folds of the filter bag or sleeve.

Referring more particularly to the drawings a T coupling 1 is connected with a threaded bushing 4, provided with an annular flange 5 adapting it to be seated in a perforation in the bottom wall 6 of the filter housing 7. Mounted upon the bushing 4 in any suitable manner, but preferably by being threaded thereto, is an inlet nozzle 8 provided below with a packing ring 9 abutting against the annular flange 5 of the bushing 4, said bushing 5 being provided with a vertical flange 10 extending about the packing 9 around said inlet nozzle. Surrounding the inlet nozzle 8 is a thimble 11 which completely incloses said inlet nozzle with the exception of its upper end. Said thimble 11 is provided with a base flange 12 for supporting the base member or disk 13, provided with a vertical peripheral flange 14, to be again referred to presently. Within a cup-shaped hollow 15 adjacent the center of the base member 13 is mounted concentrically with the inlet nozzle 8, a housing 16 therefor, said housing being provided at the top with a suitable cap or cover 17 for closing the same. At suitable points within the cylindrical walls of the housing 16 are provided a plurality of apertures or openings 18, 19, for unfiltered fluid. Connected by screw threads or in any other suitable manner to the top of the thimble 11 is a washer or spider 19ª for supporting the housing 16 concentrically with the inlet nozzle 8, said washer or disk being provided with openings 20 therethrough. The base member 13 is imperforate in construction and has tightly secured thereto about the peripheral flange 14 one end of a flexible filter sleeve or bag 21, the preferable means being to pass a binding wire or string 22 about said sleeve and flange 14. In order to mount the sleeve or bag within a small space or compass, a peculiar form is imparted thereto, preferably by the employment of a plurality of expanding rings 23 for stretching said sleeve over a broad area at different intervals, and intermediately of said rings 23 by employing a plurality of pervious or reticulated screens 24, said screens being provided centrally with apertures adapting them to gather the sleeve or bag about the housing 16. The bag or sleeve, after having been passed between and about the several rings and screens, is gathered about the top of the housing 16 (see Figs. 1 and 3) by a wire or other flexible tie 25, so that any fluid which passes into the housing 16 can pass into the filter housing 7 only by passing through the sleeve or bag 21. Threaded to the cap 17 and extending through a dome-like cover 26, which rests upon the uppermost screen 24, is a screw 27 provided along its axis within the housing 16 with a square socket 28. Connected to the upper end of the inlet nozzle 8 is a valve 29 provided with valve passages 30, said valve being reciprocable into and out of the nozzle 8 by being rotated upon its axis. For the purpose of imparting this rotation to the valve to regulate the inlet of fluid, said valve is provided above with a rectangular stem 31, which slidably engages in the socket 28 of the rotatable head 27, the entire filter being rotated in unison with the stem.

Referring now to Fig. 2, an embodiment of the device is shown in which the flow of the fluid to be filtered is to pass inwardly through the filter bag or sleeve, and into the housing. For this purpose, a cylindrical chamber 32 provided with openings 33, 34, has secured above and below, similar to Fig. 1, a filter bag or sleeve 35, but in this embodiment a plurality of screens 36 are passed over the cylindrical chamber 32 and inclosed in the bag or sleeve 35. For gathering the sleeve around the cylindrical chamber 32 a plurality of rings 37 are employed. After the filtered fluid reaches the chamber 32, it passes upwardly through an outlet 38. By referring to Fig. 4, the detail construction of one of the circular screens 24 or 36 may be seen. In this figure, a central corrugated disk 39 is disposed between two screens 40 and 41, said screens being clamped together around the outer peripheral edges by a channeled section 42. It will be noted that the central disk 39 terminates short of the periphery, thereby leaving a passage for the fluid after it has passed through the filter sleeve.

When the pressure of the fluid to be filtered distends the sleeve, the folds are pressed against the screens 40, 41, spaced apart by the corrugated disks 39, which permit the fluid to flow from between the screens and the spaced folds.

In operation, the valve 29 is opened or closed by moving it up or down in the threaded nozzle member, the rotation of the base member 13, the housing 16, and the thimble 11 being effected when the screw 27 is turned. The packing ring 9 is preferably composed of fibrous material, or the like, which constitutes a filter for any fluid which may escape from the housing between the nozzle member 16 and the thimble 11.

What I claim is—

1. The combination with a filtering sleeve gathered at intervals to form a plurality of circular superposed folds, of a spring ring to distend the folds, and annular spacing screens disposed between the said folds and each comprising a pair of reticulated annular screens, a corrugated disk disposed between the screens, and means to bind the screens and the disk together at the edges.

2. The combination with a filtering sleeve gathered at intervals to form a plurality of circular superposed folds, of a spring ring to distend the folds, and annular spacing screens disposed between the said folds and each comprising a pair of reticulated annular screens, a corrugated disk disposed between the screens and of smaller outer diameter than the screens, and means to bind the inner edges of the screens and disk together.

3. The combination with a filtering sleeve gathered at intervals to form a plurality of circular superposed folds, of a cylindrical perforated housing about which the sleeve is disposed, means to distend the folds of the sleeve, and annular spacing rings substantially as wide as the folds and disposed between them, and operative to press the gathered portions of the sleeve against the housing.

4. The combination with a perforated cylindrical housing, of a filtering sleeve larger than said housing, means to distend the sleeve and means to draw the sleeve at intervals, against the housing, to form superposed folds, said means being also adapted to space the folds apart when the sleeve is distended from within, and means to secure the sleeve at the ends to the housing.

5. In a filter, the combination with a casing member, of a nozzle member disposed within the casing, a thimble surrounding the nozzle member and having a bearing flange at the bottom, packing disposed below the said flange, a base member supported by the said flange, a perforated cylindrical housing secured to the base member, a filtering sleeve gathered at intervals about the housing to form a plurality of superposed folds, means to distend the folds of the sleeve, and means to bind the gathered portions of the sleeve about the housing and to space the adjacent folds apart when the sleeve is distended by fluid pressure from within.

6. In a filter, the combination with a base member, of a perforated cylindrical housing secured thereto, a filtering sleeve connected at one end to the base member and at the other end to the housing, a nozzle member mounted in the bottom of the filter and protruding through the base into the cylindrical housing, a thimble member disposed outside of the nozzle member and rotatable with respect thereto, the last named member being formed with a flange upon which the said base member rests, and a valve positioned at the inner end of the nozzle member.

7. In a filter, the combination with a base member, of a perforated cylindrical housing secured thereto, a filtering sleeve connected at one end to the base member and at the other end to the housing, a nozzle member mounted in the bottom of the filter and protruding through the base into the cylindrical housing, a valve positioned within the housing at the end of the nozzle, and means to regulate the valve from without the filter.

8. In a filter, the combination with the filter casing of a nozzle projecting inwardly from the bottom thereof and being internally threaded at the inner end, a perforated cylindrical housing member rotatable about the nozzle, filtering packing material disposed between the said member and the nozzle, a filtering sleeve member secured to the housing, and a valve threaded in the end of the nozzle and having a projecting portion to engage with the housing, the rotation of the housing being effective to adjust the opening of the valve.

9. In a filter, the combination with the filter casing of a nozzle projecting inwardly from the bottom thereof and being internally threaded at the inner end, a perforated cylindrical housing member rotatable about the nozzle, filtering packing material disposed between the said member and the nozzle, a filtering sleeve member secured to the housing, a valve threaded in the end of the nozzle having an upwardly projecting portion, and means attached to the top of the housing formed with a recess to engage the said upwardly projecting portion, the valve being adjusted by rotating the housing, and the housing being removable by lifting it free of the nozzle member and the projecting portion of the valve.

10. A filter element comprising a fabric bag or cylinder woven in and out over two sets of rings of different diameters to form a series of accordion-like folds, one set of said rings having spacing and supporting means extending between adjacent folds and an interior inlet member within the fabric bag or cylinder, substantially as described.

In testimony whereof I have signed my name to this specification, in the presence of two subscribing witnesses, on this 12th day of April A. D. 1910.

WILLIAM L. MORRIS.

Witnesses:
 Roy C. Walker,
 Frederick G. Weir.